United States Patent
Burrowes et al.

(10) Patent No.: US 7,901,016 B2
(45) Date of Patent: Mar. 8, 2011

(54) TRACK SEGMENT WITH EP(D)M RUBBER BASED BACKER AND METHOD OF MAKING

(75) Inventors: Thomas George Burrowes, North Canton, OH (US); Kathy Ann Folk, Uniontown, OH (US); David Joseph Maguire, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 154 days.

(21) Appl. No.: 11/875,417

(22) Filed: Oct. 19, 2007

(65) Prior Publication Data

US 2009/0102280 A1 Apr. 23, 2009

(51) Int. Cl.
*B62D 55/21* (2006.01)
(52) U.S. Cl. .......................... 305/189; 305/192
(58) Field of Classification Search .............. 305/189, 305/192, 197
See application file for complete search history.

(56) References Cited

U.S. PATENT DOCUMENTS

| | | | |
|---|---|---|---|
| 2,162,700 A | 6/1939 | Christmas | |
| 2,369,130 A | 2/1945 | Benson | |
| 2,731,304 A | 1/1956 | Kumbaugh | |
| 3,078,128 A | 2/1963 | Speidel et al. | |
| 3,642,332 A | 2/1972 | Sinclair et al. | |
| 3,944,296 A | 3/1976 | Stampone | |
| 4,059,314 A | 11/1977 | Amstutz | |
| 4,192,790 A | 3/1980 | McKinstry et al. | |
| 4,461,516 A | 7/1984 | Lee | |
| 4,470,641 A | 9/1984 | Swarthout | |
| 4,500,466 A | 2/1985 | Hayes et al. | |
| 4,505,984 A | 3/1985 | Stelzer et al. | |
| 4,587,280 A | 5/1986 | Guha et al. | |
| 4,713,409 A | 12/1987 | Hayes et al. | |
| 4,843,114 A | 6/1989 | Touchet et al. | |
| 4,871,216 A * | 10/1989 | Cory | 305/59 |
| 4,892,365 A * | 1/1990 | Szakacs | 305/59 |
| 4,915,895 A | 4/1990 | Savage et al. | |
| 4,962,136 A * | 10/1990 | Peters | 523/220 |
| 4,983,678 A | 1/1991 | Saito et al. | |
| 5,208,294 A | 5/1993 | Brown | |
| 5,264,290 A | 11/1993 | Touchet et al. | |
| 5,298,562 A | 3/1994 | Ceska et al. | |
| 5,310,811 A | 5/1994 | Cottman et al. | |
| 5,376,448 A | 12/1994 | Suzuki et al. | |
| 5,506,308 A | 4/1996 | Ahmad et al. | |
| 5,610,217 A | 3/1997 | Yarnell et al. | |
| 5,830,946 A | 11/1998 | Ozawa et al. | |
| 6,040,364 A | 3/2000 | Mabry et al. | |
| 6,300,421 B1 | 10/2001 | Blok et al. | |
| 6,423,781 B1 * | 7/2002 | Oziomek et al. | 525/236 |
| 6,764,143 B2 | 7/2004 | Peterson et al. | |

(Continued)

*Primary Examiner* — Russell D Stormer
(74) *Attorney, Agent, or Firm* — Alvin T. Rockhill; Kathleen K. Bowen (57) ABSTRACT

The present invention is directed generally to track segments for track vehicles and, more specifically, to a track segment having an ethylene propylene diene monomer (EP(D)M) rubber based backer, and a method of making. In one embodiment, the track segment includes an EP(D)M rubber based backer including a rubber compound having 100 phr EP(D)M rubber wherein the diene component is optionally present, a peroxide curing agent, and one or more acrylic and/or methacrylic coagents. The track segment further includes a track pad and a track body. The track pad and backer cooperate with the track body to define the track segment for use in a track for a track vehicle. The EP(D)M rubber based compound provides a desirable balance of low heat build-up under heavy dynamic cyclic compression conditions, and also has a desirable load carrying capability, high heat resistance, and good cut/tear strength in hot climates.

19 Claims, 1 Drawing Sheet

U.S. PATENT DOCUMENTS

| | | | |
|---|---|---|---|
| 6,838,495 B2 * | 1/2005 | Gatti et al. | 523/209 |
| 6,918,849 B2 | 7/2005 | Gregg et al. | |
| 7,048,343 B2 | 5/2006 | Peterson et al. | |
| 7,137,675 B1 | 11/2006 | Simula et al. | |
| 2004/0143050 A1 * | 7/2004 | Gatti et al. | 524/420 |
| 2006/0111498 A1 | 5/2006 | Pilkington | |
| 2006/0148931 A1 * | 7/2006 | Xie et al. | 523/201 |
| 2006/0199910 A1 * | 9/2006 | Walton et al. | 525/192 |
| 2006/0199917 A1 * | 9/2006 | Chino | 525/374 |
| 2007/0015893 A1 * | 1/2007 | Hakuta et al. | 528/34 |
| 2008/0018173 A1 * | 1/2008 | Kremer et al. | 305/193 |
| 2008/0108753 A1 * | 5/2008 | Achten et al. | 525/123 |

* cited by examiner

TRACK SEGMENT WITH EP(D)M RUBBER BASED BACKER AND METHOD OF MAKING

FIELD OF THE INVENTION

The present invention is directed generally to track segments for track vehicles and, more specifically, to a track segment having an ethylene propylene (diene) monomer (EP (D)M) rubber based backer, and method of making same.

BACKGROUND OF THE INVENTION

Modern track vehicles, such as the Abrams tank or Bradley fighting vehicle, can weigh in excess of 71 tons and have tracks whose bushing failures can be a major share of track repair and replacement costs, particularly, with deployment of heavy, fast track vehicles to hot climates, e.g., desert or desert-like environments. These bushing failures appear to be due largely to the detrimental effect of heat on bushing rubber, such heat originating from backer hysteresis as well as the external environment.

The backer, which is part of a track vehicle's rubber/metal track providing a path for a roadwheel to traverse in the undercarriage of the track vehicle, is subjected to repeat cyclic loadings as each roadwheel traverses the track segment and the track pads contact ground. Since the 1980's, it has been conventional to use backers based on styrene-butadiene rubber ("SBR"). These backers, while proven to be acceptable for low speed, lighter track vehicles operating in cool climates, are unsuitable for heavier, faster track vehicles deployed in hot climates due to the effect on bushing rubber. In addition, deterioration of the backer itself can be problematic under such conditions, which further adds to track repair and replacement costs. Backer failures can be due to heat build-up and/or may occur by tearing, chunking and abrading, for example.

Accordingly, it would thus be desirable to provide a track segment with a rubber based backer that will provide a desirable balance of low heat build-up under heavy dynamic cyclic compression conditions, and also have a desirable load carrying capability, high heat resistance, and good cut/tear strength in hot climates.

SUMMARY OF THE INVENTION

In accordance with an embodiment of the present invention, a track segment includes an EP(D)M rubber based backer including a rubber compound having 100 phr EP(D)M rubber wherein the diene component is optionally present, a peroxide curing agent, and one or more acrylic and/or methacrylic coagents. The track segment further includes a track pad and a track body. The track pad and backer cooperate with the track body to define the track segment for use in a track for a track vehicle.

In another embodiment, a track segment includes an EP(D)M rubber based backer including a rubber compound having 100 phr EP(D)M rubber wherein the diene component is optionally present, a peroxide curing agent present in an amount of about 3 phr to about 9 phr, and a metal salt or ester of acrylic and/or methacrylic acid present in an amount of about 5 phr to about 30 phr. The track segment further includes a track pad and a track body. The track pad and backer cooperate with the track body to define the track segment for use in a track for a track vehicle.

In another embodiment, a method of making an EP(D)M rubber based backer is provided which includes forming an EP(D)M rubber based compound into an EP(D)M rubber based backer for use with a track segment. The EP(D)M rubber based compound having 100 phr EP(D)M rubber wherein the diene component is optionally present, a peroxide curing agent, and one or more acrylic and/or methacrylic coagents.

By virtue of the foregoing, there is thus provided a track segment with an EP(D)M rubber based backer that will provide a desirable balance of low heat build-up under heavy dynamic cyclic compression conditions, and also have a desirable load carrying capability, high heat resistance, and good cut/tear strength in hot climates.

BRIEF DESCRIPTION OF THE DRAWING

The accompanying drawings, which are incorporated in and constitute a part of this specification, illustrate an embodiment of the invention and, together with the general description of the invention given above, and detailed description given below, serve to explain the invention.

DETAILED DESCRIPTION

Figure 1:
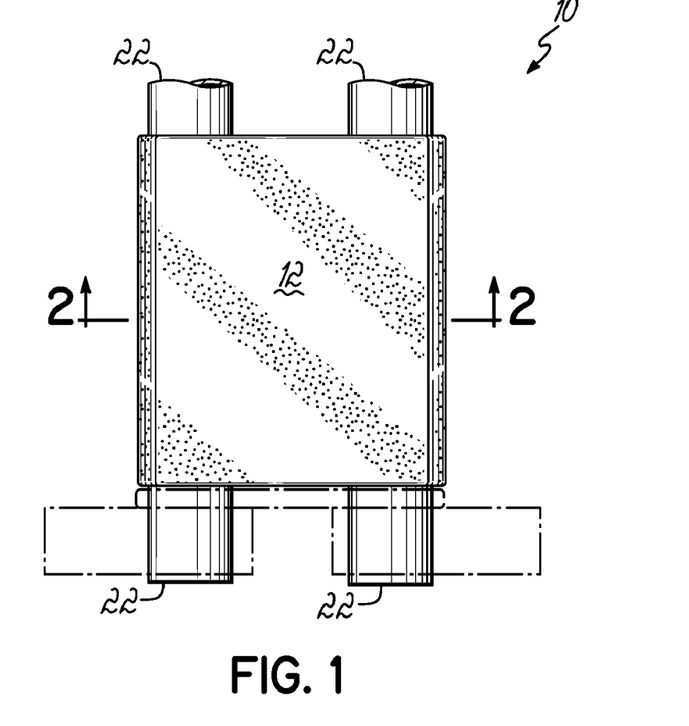
FIG. 1 is a plan view of a track segment with EP(D)M rubber based backer in accordance with an embodiment of the invention.
Figure 2:
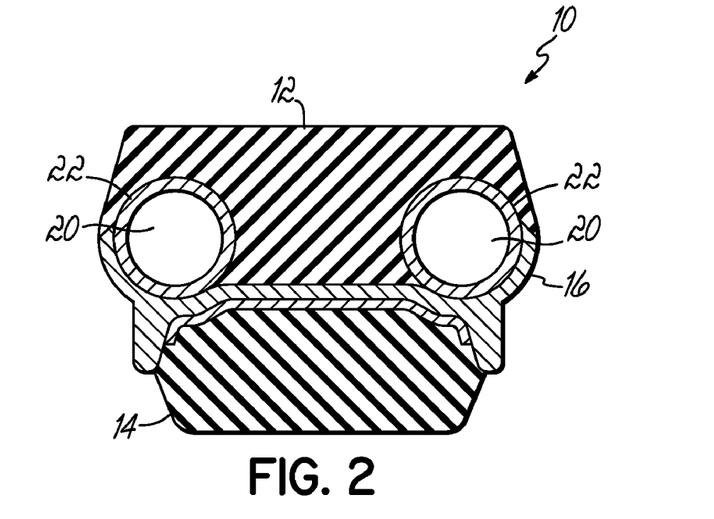
FIG. 2 is a cross-sectional view of the track segment of FIG. 1 taken along line 2-2.

With reference to FIGS. 1 and 2, a track segment 10, in accordance with an embodiment of the invention, is shown having an EP(D)M rubber based backer 12, a track pad 14, and a track body 16 for use in a track (not shown). The track pad 14 and the backer 12 cooperate with the track body 16 to define the track segment 10. In one example, the backer 12 and track pad 14 may be secured to the track body 16 via known means, such as via nuts and bolts or adhesives. Such track segment 10 may be used with track vehicles, e.g., military tanks or fighting vehicles, such as those deployed in hot climates, e.g., desert or desert-like environments.

The track body 16 may be metallic, as known in the art, and includes openings 20, generally referred to as binoculars, which are used for mounting the track segments 10 on pins 22 to form the track used on track vehicles. Bushing rubber (not shown) generally is provided about the portion of the pin 22 that is received within the binocular 20.

In use, the backer 12 is subjected to repeat cyclic loadings as each roadwheel (not shown) of the track vehicle traverses the track segment 10 and the track pads 14 contact ground. To reduce or prevent deterioration of the backer 12 and provide a desirable balance of low heat build-up under heavy dynamic cyclic compression conditions, a desirable load carrying capability, high heat resistance, and good cut/tear strength in hot climates, the backer 12 is formed from an EP(D)M rubber based compound, as described below. In addition, each roadwheel generally is provided with rubber therearound which contacts the backer, such roadwheel rubber and the track pad 14 may be formed generally from the EP(D)M rubber based compound but also may be formed from other suitable rubber compounds known in the art.

The EP(D)M rubber based compound of the backer 12 includes EP(D)M rubber wherein the diene component is optionally present, one or more acrylates and/or methacrylates (or acrylic coagents), a peroxide curing agent, and optional additives. In one embodiment, the rubber is EPDM rubber such that the diene component is present in the rubber. In another embodiment, the rubber is EPM rubber such that the rubber is free from the diene component. Accordingly, the designation EP(D)M indicates that the rubber may be either EPDM or EPM rubber. In other words, the diene component is optionally present.

In one embodiment, the backer includes a rubber compound having 100 phr EP(D)M rubber wherein the diene component is optionally present. Such EP(D)M rubber may include ethylene in a range of about 50% to about 70% by weight and diene in a range of from about and 0% to about 10% by weight. In another embodiment, the EP(D)M rubber includes ethylene in a range from about 55% to about 70% by weight. In another embodiment, EPDM rubber includes diene in a range of from about and 0.1% to about 8.5% by weight. In one example, the diene includes ethylidene norbornene (ENB) or dicyclopentadiene (DCPD).

The acrylates and methacrylates (or acrylic and methacrylic coagents) can include metal salts or esters of acrylic and/or methacrylic acid. In one example, the metal salts can include zinc, cadmium, calcium, magnesium, sodium or aluminum salts. In one embodiment, the salt is zinc. Specific examples of metal salts of acrylic or methacrylic acids include zinc diacrylate and zinc dimethacrylate. Concerning acrylic or methacrylic esters, the direct esterification of alcohol, such as methanol, ethanol, and the like, with the acid is generally the only significant route for the production of the esters. Examples of alkyl esters of acrylic or methacrylic acid are methyl-, butyl-, ethyl-, and 2-ethylhexyl-acrylate. Amounts of the acrylic and/or methacrylic coagents can range from about 5 phr to about 30 phr. In another embodiment, the range may be from about 10 phr to about 20 phr.

The peroxide curing agent can include an organic peroxide curing agent, such as dicumyl peroxide, bis-(t-butyl peroxydiisopropyl benzene, t-butyl perbenzoate, di-t-butyl peroxide, 2,5-dimethyl-2,5-di-t-butylperoxy hexane, alpha-alpha-bis(t-butylperoxy) diisopropylbenzene. In one embodiment, the organic peroxide curative is dicumyl peroxide. Cure-effective amounts of organic peroxide may range from about 0.5 phr to about 9 phr. In another embodiment, the peroxide curing agent may range from about 2 phr to about 4 phr. In one example, the peroxide curing agent can include about 40% or 60% by weight peroxide. In the instance that the peroxide curing agent is provided in a concentration less than 100% by weight, the amount of peroxide (in phr) is adjusted accordingly, as understood by a person having ordinary skill in the art. Sulfur may optionally be added to the organic peroxide curative as part of a mixed cure system, such as to improve the Young's modulus without negatively affecting tear resistance of the rubber compound.

The rubber compound can further include fillers, such as carbon black and/or silica, as well as coupling agents, antidegradants, and fibers, such as carbon fibers.

The carbon black can include conventional carbon black, such as N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991, for example. The silica can include hydrated amorphous silica, for example. The silica can also include conventional pyrogenic and precipitated siliceous pigments, such as, for example, that obtained by acidification of a soluble silicate, e.g., sodium silicate. In one embodiment, the carbon black and/or silica can range from about 5 phr to about 120 phr. In another embodiment, the range includes about 30 phr to about 90 phr. In another embodiment, the range includes about 45 phr to about 75 phr.

The coupling agents can include organofunctional silane coupling agents such as vinyl silanes. In one embodiment, the coupling agents can range from about 0 phr to about 15 phr. In another embodiment, the range includes about 1 phr to about 9 phr. In another embodiment, the range includes about 3 phr to about 7 phr.

The antidegradants can include any suitable free radical scavenging antioxidant as known in the art. In one example, the antioxidant can include zinc 2-mercapto-toluimidazole, or aminic antioxidants, such as hydroquinoline, phenylenediamine, and/or derivatives, or mixtures thereof. In one embodiment, the antidegradant can range from about 0.5 phr to about 6 phr. In another embodiment, the range includes about 1 phr to about 2.5 phr.

The fiber can include carbon fiber such as milled or chopped carbon fiber, with or without sizing. Other fibers may include a polyamide, such as nylon and the like. In one example, the fiber is Kevlar®. In one embodiment, the fiber can range from about 0 phr to about 50 phr. In another embodiment, the range includes about 0 phr to about 25 phr. In another embodiment, the range includes about 1 phr to about 20 phr.

Other conventional ethylene-alpha-olefin elastomer additives, process and extender oils, waxes, clays, talcs, pigments, plasticizers, softeners and the like may also be added according to common rubber processing practice without departing from the invention. Such additives may be used in conventional amounts.

In one embodiment, the EP(D)M rubber based backer compound includes a rubber compound having 100 phr EP(D)M rubber wherein the diene component is optionally present, about 3 to about 9 phr organic peroxide, and about 5 phr to about 30 phr of one or more acrylic and/or methacrylic coagents, e.g., zinc diacrylate, zinc dimethacrylate, or acrylic ester. In one example, the EP(D)M rubber is EPDM.

The mixing of the rubber compound can be accomplished by methods known to those having ordinary skill in the art. For example, the ingredients are typically mixed in at least two stages, namely, at least one non-productive stage followed by a productive mix stage. The final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the rubber mixing art. The EP(D)M rubber based compound ultimately may be shaped and cured using a normal cure cycle so as to form the backer.

Non-limiting examples of an EPDM rubber based compound in accordance with the description are now disclosed below. These examples are merely for the purpose of illustration and are not to be regarded as limiting the scope of the invention or the manner in which it can be practiced. Other examples will be appreciated by a person having ordinary skill in the art.

Tables IA and IB: Test Samples 1-20

TABLE IA

|  | Example 1 (phr) | Example 2 (phr) | Example 3 (phr) | Example 4 (phr) | Example 5 (phr) | Example 6 (phr) | Example 7 (phr) | Example 8 (phr) | Example 9 (phr) | Example 10 (phr) |
|---|---|---|---|---|---|---|---|---|---|---|
| NON-PRODUCTIVE | | | | | | | | | | |
| EPDM rubber[1] | 100 | 100 | 100 | 100 | 100 | 100 | 100 | 100 | 100 | 100 |
| Carbon black, ASTM N330 | 15 | 15 | 15 | 30 | 30 | 30 | | | 20 | 20 |

TABLE IA-continued

|  | Example 1 (phr) | Example 2 (phr) | Example 3 (phr) | Example 4 (phr) | Example 5 (phr) | Example 6 (phr) | Example 7 (phr) | Example 8 (phr) | Example 9 (phr) | Example 10 (phr) |
| --- | --- | --- | --- | --- | --- | --- | --- | --- | --- | --- |
| Hydrated amorphous silica[2] | 60 | 60 | 60 | 30 | 30 | 30 | 60 | 60 | 40 | 40 |
| Vinyl silane coupling agent[3] | 6 | 6 | 6 | 3 | 3 | 3 | 6 | 6 | 4 | 4 |
| Zinc 2-mercapto-toluimidazole[4] | 1 | 1 | 1 | 1 | 1 | 1 | 1 | 1 | 1 | 1 |
| 1,2-dihydro-2,2,4-trimethylquinoline (polymerized)[5] | 1 | 1 | 1 | 1 | 1 | 1 | 1 | 1 | 1 | 1 |
| Zinc diacrylate (w/ scorch retardant)[6] | 15 |  |  | 15 |  |  |  |  |  |  |
| Zinc dimethacrylate (w/ scorch retardant)[7] |  | 15 |  |  | 15 |  |  |  |  |  |
| Acrylic ester (w/ scorch retardant)[8] |  |  | 15 |  |  | 15 | 15 | 10 | 15 | 10 |
| Rubber process oil (highly paraffinic) | 30 | 30 | 30 | 30 | 30 | 30 | 30 | 30 | 30 | 30 |
| PRODUCTIVE |  |  |  |  |  |  |  |  |  |  |
| a,a'-bis(t-butyl peroxy)diisopropyl benzene (40%)[9] | 6 | 6 | 6 | 6 | 6 | 6 | 6 | 7.5 | 6 | 7.5 |
| Total | 234 | 234 | 234 | 216 | 216 | 216 | 219 | 215.5 | 217 | 213.5 |

[1]Royalene 4817 (now Royalene 563) (57% ethylene, 5.0% ENB, ML 1 + 4 @ 125° C. = 75), available from Lion Copolymer of Baton Rouge, Louisiana.
[2]Ultrasil VN3, available from Degussa of New Jersey.
[3]DSC-74 (70% activity on synthetic calcium silicate), available from Excel Polymers of Akron, Ohio.
[4]Vanox ZMTI, available from RT Vanderbilt of Norwalk, Connecticut.
[5]Agerite Resin D, available from RT Vanderbilt of Norwalk, Connecticut.
[6]Saret SR633, available from Sartomer of Pennsylvania.
[7]Saret SR634, available from Sartomer of Pennsylvania.
[8]Saret SR522, available from Sartomer of Pennsylvania.
[9]Vul-Cup 40KE (40% activity on Burgess KE clay hinder), available from Harwick Standard of Akron, Ohio.

TABLE IB

|  | Example 11 (phr) | Example 12 (phr) | Example 13 (phr) | Example 14 (phr) | Example 15 (phr) | Example 16 (phr) | Example 17 (phr) | Example 18 (phr) | Example 19 (phr) | Example 20 (phr) |
| --- | --- | --- | --- | --- | --- | --- | --- | --- | --- | --- |
| NON-PRODUCTIVE |  |  |  |  |  |  |  |  |  |  |
| EPDM rubber[1] | 100 | 100 | 100 | 100 | 100 | 100 | 100 | 100 | 100 | 100 |
| Carbon black, ASTM N330 |  |  |  |  | 15 | 15 | 15 | 15 | 15 | 15 |
| Hydrated amorphous silica[2] | 50 | 70 | 50 | 50 | 30 | 30 | 30 | 30 | 30 | 30 |
| Vinyl silane coupling agent[3] | 5 | 7 | 5 | 5 | 3 | 3 | 3 | 3 | 3 | 3 |
| Zinc 2-mercapto-toluimidazole[4] | 1 | 1 | 1 | 1 | 1 | 1 | 1 | 1 | 1 | 1 |
| 1,2-dihydro-2,2,4-trimethylquinoline (polymerized)[5] | 1 | 1 | 1 | 1 | 1 | 1 | 1 | 1 | 1 | 1 |
| Zinc diacrylate (w/ scorch retardant)[6] |  |  |  | 15 | 15 | 15 | 15 | 15 | 15 | 15 |
| Acrylic ester (w/ scorch retardant)[7] | 15 | 15 | 15 | 15 |  |  |  |  |  |  |
| Rubber process oil (highly paraffinic) | 20 | 40 | 30 | 30 | 30 | 30 | 30 | 30 | 30 | 30 |
| Chopped carbon fiber (⅛" long)[8] |  |  | 5 |  | 15 |  |  | 15 |  |  |
| Milled carbon fiber (no sizing)[9] |  |  |  |  |  | 15 |  |  | 15 |  |
| Milled carbon fiber (w/sizing)[10] |  |  | 5 | 10 |  |  | 15 |  |  | 15 |

TABLE IB-continued

|  | Example 11 (phr) | Example 12 (phr) | Example 13 (phr) | Example 14 (phr) | Example 15 (phr) | Example 16 (phr) | Example 17 (phr) | Example 18 (phr) | Example 19 (phr) | Example 20 (phr) |
|---|---|---|---|---|---|---|---|---|---|---|
| PRODUCTIVE | | | | | | | | | | |
| a,a'-bis(t-butyl peroxy)diisopropyl benzene (40%)[11] | 6 | 6 | 7.5 | 7.5 | 6 | 6 | 6 | 7.5 | 7.5 | 7.5 |
| Total | 198 | 240 | 219.5 | 219.5 | 216 | 216 | 216 | 217.5 | 217.5 | 217.5 |

[1] Royalene 4817 (now Royalene 563) (57% ethylene, 5.0% ENB, ML 1 + 4 @ 125° C. = 75), available from Lion Copolymer of Baton Rouge, Louisiana.
[2] Ultrasil VN3, available from Degussa of New Jersey.
[3] DSC-74 (70% activity on synthetic calcium silicate), available from Excel Polymers of Akron, Ohio.
[4] Vanox ZMTI, available from RT Vanderbilt of Norwalk, Connecticut.
[5] Agerite Resin D, available from RT Vanderbilt of Norwalk, Connecticut.
[6] Saret SR633, available from Sartomer of Pennsylvania.
[7] Saret SR522, available from Sartomer of Pennsylvania.
[8] PX33CF0125-14, available from Zoltek of St. Louis, Missouri.
[9] PX30MF0150, available from Zoltek of St. Louis, Missouri.
[10] PX33MF015, available from Zoltek of St. Louis, Missouri.
[11] Vul-Cup 40KE (40% activity on Burgess KE clay binder), available from Harwick Standard of Akron, Ohio.

In preparing each of the EPDM based rubber compounds, the non-productive stage components were added to a Banbury mixer. Those components were mixed for about 4-5 minutes until a temperature of about 160° C. was reached. The productive stage components were added and mixed together for about 1.5 minutes until a temperature of about 110° C. was reached. Then, the stock was passed through the mill and allowed to cool.

A control test sample was similarly prepared. The control sample was a standard sulfur cured SBR based compound, which included 100 phr SBR, and sulfur and conventional additives in conventional amounts.

Each of the EPDM rubber based compounds and the SBR control sample were characterized using, for example, standard ASTM testing procedures or variations thereof as indicated in Tables 2A (Examples 1-10) and 2B (Examples 11-20 and SBR control sample) below. The results also are shown in those Tables and discussed further below.

TABLE 2A

| Test Results | | | | | |
|---|---|---|---|---|---|
|  | Example 1 | Example 2 | Example 3 | Example 4 | Example 5 |
| Modulus - Measure of Stiffness in Tension | | | | | |
| Hardness - Measure of Stiffness in Compression | | | | | |
| Modulus/Tensile/Elongation ASTM D412 | | | | | |
| Samples Cured 10'/340 F. | | | | | |
| 100% Modulus in PSI | 655 | 587 | 868 | 581 | 409 |
| 200% Modulus in PSI | 1628 | 1288 | — | 1513 | 991 |
| 300% Modulus in PSI | — | 2013 | — | — | 1786 |
| Ultimate Tensile in PSI | 2409 | 2493 | 1888 | 2475 | 2698 |
| Ultimate Elongation in % | 275 | 383 | 196 | 285 | 447 |
| Shore A Hardness ASTM D2240 | 77 | 78 | 82 | 71 | 67 |
| Specific Gravity ASTM D792 | 1.145 | 1.135 | 1.124 | 1.099 | 1.093 |
| Modulus/Tensile/Elongation ASTM D412 | | | | | |
| Samples Cured 10'/340 F. | | | | | |
| Cured Samples Oven Aged 70 hours/ 257 F. | | | | | |
| 100% Modulus in PSI | 846 | 797 | 1048 | 727 | 498 |
| 200% Modulus in PSI | 2103 | 1749 | — | 1879 | 1255 |
| 300% Modulus in PSI | — | — | — | — | 2184 |
| Ultimate Tensile in PSI | 2375 | 2409 | 1745 | 2368 | 2564 |
| Ultimate Elongation in % | 222 | 267 | 163 | 239 | 349 |
| Shore A Hardness ASTM D2240 | 81 | 82 | 84 | 74 | 71 |
| Measure of Load Carrying Capability | | | | | |
| Load Deflection in-house variation on ASTM D575 | | | | | |
| Samples Cured 10'/340 F. | | | | | |
| lbf on 0.5" puck | | | | | |
| lbf at 10% Deflection | 263 | 218 | 261 | 170 | 154 |
| lbf at 20% Deflection | 439 | 423 | 522 | 323 | 294 |
| lbf at 30% Deflection | 641 | 680 | 1015 | 560 | 466 |

TABLE 2A-continued

| Test Results | | | | | |
|---|---|---|---|---|---|
| lbf at 40% Deflection | 983 | 1061 | 1589 | 885 | 715 |
| Measure of Heat Build-up/ Generation and Fatigue Resistance due to Dynamic Cyclic Compression Blowout In-house variation on ASTM D623 Samples Cured 35'/305 F. | | | | | |
| 1800 cycles/min 405N Load 6.35 mm stroke 93 C. preheat 0.7 in Dia | | sample not tested | | | |
| Time to Blowout or 60 minutes | 8 min | | 60 min | 60 min | 33 min |
| Temperature @ Blowout/End of Test | 144 C. | | 144 C. | 152 C. | 148 C. |
| Final Compression | 5 mm | | 1.5 mm | 9 mm | 6 mm |
| First Inflection | 2.5 min@120 C. | | 2 min@120 C. | 3 min@128 C. | 3 min@120 C. |
| Second Inflection | 5 min@138 C. | | 6 min@140 C. | 7 min@146 C. | 9 min@142 C. |
| Appearance Inside Sample | sample fractured | sample not tested | nothing | horizontal split porosity inside | sample fractured |
| Flex Fatigue In-house variation on ASTM D623 Samples Cured 10'/340 F. samples preconditioned to 122 F. 0.25" stroke/30 minutes | | | | | |
| % Set | 4 | 2.5 | 2.5 | 3.7 | 5.8 |
| Temp Rise F. | 149 | 138 | 122 | 123 | 143 |
| Proprietary Fatigue Load Deflection Test Constant Load test developed in-house Samples Cured 10'/340 F. | | | | | |
| Tan Delta at 500 cycles | 0.138 | | 0.139 | 0.148 | 0.121 |
| Tan Delta at 2000 cycles | 0.115 | | 0.112 | 0.125 | 0.105 |
| Tan Delta at 6000 cycles | 0.104 | | 0.098 | 0.111 | 0.100 |
| Tan Delta at 12000 cycles | 0.103 | | 0.097 | 0.109 | 0.101 |
| Temp in C. at 500 cycles | 104.5 | | 102.8 | 104.2 | 103.9 |
| Temp in C. at 2000 cycles | 122.6 | | 113.6 | 123.6 | 122.4 |
| Temp in C. at 6000 cycles | 138.6 | | 123.7 | 144.1 | 137.2 |
| Temp in C. at 12000 cycles | 141.6 | | 125.2 | 144.1 | 142.1 |
| Sample Appearance | ok | sample not tested | ok | sample fractured | sample fractured |
| Measure of Creep Compression Set In-house Variation on ASTM D395 constant deflection test Samples Cured 10'/340 F. | | | | | |
| % Set After 22 hours/212 F. | 24 | 30 | 16 | 19 | 25 |
| % Set After 22 hours/257 F. | 31 | 46 | 27 | 32 | 43 |
| Measure of Tear Resistance Related to Chip/Chunk field performance Die B Tear ASTM D624 Samples Cured 10'/340 F. | | | | | |
| Die B Tear @ 70 F. in lbf | 179 | 232 | 172 | 135 | 186 |
| Die B Tear @ 250 F. in lbf | 100 | 126 | 90 | 82 | 175 |
| Samples Oven Aged 70 hours/257 F. | | | | | |
| Die B Tear @ 250 F. in lbf | 96 | 118 | 100 | 84 | 109 |
| Measure of Curing and Process Properties Cure Rheometer ASTM D5289 | | | | | |
| minutes at temp C. | 3 min @ 191 C. | 3 min @ 191 C. | 3 min @ 191 C. | 3 min @ 191 C. | 3 min @ 191 C. |
| minimum torque dN-m | 5.6 | 5.0 | 6.3 | 3.9 | 3.5 |
| maximum torque dN-m | 50.7 | 47.4 | 83.4 | 44.8 | 38.0 |
| net torque dN-m | | | | | |
| T/rise in minutes | 0.21 | 0.23 | 0.18 | 0.24 | 0.25 |
| T25 in minutes | | | | | |
| T50 in minutes | | | | | |
| T90 in minutes | 1.35 | 1.31 | 1.05 | 1.45 | 1.68 |

TABLE 2A-continued

| | Test Results | | | | |
|---|---|---|---|---|---|
| | Example 6 | Example 7 | Example 8 | Example 9 | Example 10 |
| Modulus - Measure of Stiffness in Tension | | | | | |
| Hardness - Measure of Stiffness in Compression | | | | | |
| Modulus/Tensile/Elongation ASTM D412 | | | | | |
| Samples Cured 10'/340 F. | | | | | |
| 100% Modulus in PSI | 600 | 852 | 743 | 707 | 698 |
| 200% Modulus in PSI | 1532 | | 1862 | 1731 | 1755 |
| 300% Modulus in PSI | — | | | | |
| Ultimate Tensile in PSI | 1722 | 1682 | 1978 | 1795 | 1968 |
| Ultimate Elongation in % | 212 | 170 | 203 | 205 | 213 |
| Shore A Hardness ASTM D2240 | 72 | 84 | 79 | 77 | 76 |
| Specific Gravity ASTM D792 | 1.081 | 1.106 | 1.102 | 1.089 | 1.089 |
| Modulus/Tensile/Elongation ASTM D412 | | | | | |
| Samples Cured 10'/340 F. | | | | | |
| Cured Samples Oven Aged 70 hours/257 F. | | | | | |
| 100% Modulus in PSI | 650 | 918 | 842 | 724 | 714 |
| 200% Modulus in PSI | 1591 | | | 1653 | |
| 300% Modulus in PSI | — | | | | |
| Ultimate Tensile in PSI | 2066 | 1717 | 1501 | 1996 | 1864 |
| Ultimate Elongation in % | 227 | 169 | 164 | 215 | 201 |
| Shore A Hardness ASTM D2240 | 75 | 87 | 82 | 80 | 78 |
| Measure of Load Carrying Capability | | | | | |
| Load Deflection in-house variation on ASTM D575 | | | | | |
| Samples Cured 10'/340 F. | | | | | |
| lbf on 0.5" puck | | | | | |
| lbf at 10% Deflection | 184 | 240 | 197 | 177 | 167 |
| lbf at 20% Deflection | 361 | 539 | 421 | 371 | 344 |
| lbf at 30% Deflection | 612 | 869 | 745 | 620 | 584 |
| lbf at 40% Deflection | 964 | 1271 | 1140 | 946 | 907 |
| Measure of Heat Build-up/Generation and Fatigue Resistance due to Dynamic Cyclic Compression | | | | | |
| Blowout In-house variation on ASTM D623 | | | | | |
| Samples Cured 35'/305 F. | | | | | |
| 1800 cycles/min | | | | | |
| 405N Load | | | | | |
| 6.35 mm stroke 93 C. preheat 0.7 in Dia | | | | | |
| Time to Blowout or 60 minutes | 60 min | 60 min | 60 min | 60 min | 60 min |
| Temperature @ Blowout/End of Test | 134 C. | 134 C. | 129 C. | 134 C. | 132 C. |
| Final Compression | 7 mm | 1.5 mm | 1.5 mm | 3 mm | 3 mm |
| First Inflection | 3 min@120 C. | 4 min @ 124 C. | 4 min @ 122 C. | 4 min @ 124 C. | 4 min @ 124 C. |
| Second Inflection | 7 min@132 C. | | | | |
| Appearance Inside Sample | nothing | nothing | nothing | nothing | nothing |
| Flex Fatigue In-house variation on ASTM D623 | | | | | |
| Samples Cured 10'/340 F. | | | | | |
| samples preconditioned to 122 F. | | | | | |
| 0.25" stroke/30 minutes | | | | | |
| % Set | 2.1 | 1.9 | 2.0 | 2.3 | 2.8 |
| Temp Rise F. | 121 | 107 | 92 | 124 | 108 |
| Proprietary Fatigue Load Deflection Test | | | | | |
| Constant Load test developed in-house | | | | | |
| Samples Cured 10'/340 F. | | | | | |
| Tan Delta at 500 cycles | 0.106 | 0.109 | 0.104 | 0.106 | 0.097 |
| Tan Delta at 2000 cycles | 0.086 | 0.089 | 0.081 | 0.084 | 0.078 |
| Tan Delta at 6000 cycles | 0.076 | 0.079 | 0.071 | 0.074 | 0.070 |
| Tan Delta at 12000 cycles | 0.076 | 0.077 | 0.070 | 0.073 | 0.068 |
| Temp in C. at 500 cycles | 104.4 | 104.4 | 101.1 | 104.0 | 104.4 |
| Temp in C. at 2000 cycles | 117.7 | 112.8 | 111.2 | 116.7 | 116.3 |
| Temp in C. at 6000 cycles | 128.1 | 120.0 | 119.6 | 125.8 | 124.4 |

TABLE 2A-continued

Test Results

| | | | | | |
|---|---|---|---|---|---|
| Temp in C. at 12000 cycles | 129.3 | 120.8 | 120.7 | 127.1 | 125.2 |
| Sample Appearance | ok | ok | ok | ok | ok |
| Measure of Creep | | | | | |
| Compression Set In-house Variation on ASTM D395 constant deflection test | | | | | |
| Samples Cured 10'/340 F. | | | | | |
| % Set After 22 hours/212 F. | 11 | 12 | 10 | 10 | 9 |
| % Set After 22 hours/257 F. | 23 | 21 | 20 | 20 | 18 |
| Measure of Tear Resistance Related to Chip/Chunk field performance | | | | | |
| Die B Tear ASTM D624 | | | | | |
| Samples Cured 10'/340 F. | | | | | |
| Die B Tear @ 70 F. in lbf | 122 | 193 | 180 | 169 | 163 |
| Die B Tear @ 250 F. in lbf | 64 | 101 | 90 | 75 | 80 |
| Samples Oven Aged 70 hours/257 F. | | | | | |
| Die B Tear @ 250 F. in lbf | 67 | 112 | 96 | 81 | 87 |
| Measure of Curing and Process Properties | | | | | |
| Cure Rheometer ASTM D5289 | | | | | |
| minutes at temp C. | 3 min @ 191 C. | 30'/170 C. | 30'/170 C. | 30'/170 C. | 30'/170 C. |
| minimum torque dN-m | 3.8 | 5.8 | 6.0 | 4.2 | 4.4 |
| maximum torque dN-m | 55.7 | 78.3 | 68.6 | 61.4 | 59.9 |
| net torque dN-m | | | | | |
| T/rise in minutes | 0.24 | 0.3 | 0.3 | 0.4 | 0.4 |
| T25 in minutes | | | | | |
| T50 in minutes | | | | | |
| T90 in minutes | 1.14 | 5.3 | 7.0 | 6.5 | 7.8 |

TABLE 2B

Test Results

| | Example 11 | Example 12 | Example 13 | Example 14 | Example 15 | Example 16 |
|---|---|---|---|---|---|---|
| Modulus - Measure of Stiffness in Tension | | | | | | |
| Hardness - Measure of Stiffness in Compression | | | | | | |
| Modulus/Tensile/Elongation ASTM D412 | | | | | | |
| Samples Cured 10'/340 F. | | | | | | |
| 100% Modulus in PSI | 739 | 708 | 1064 | 1006 | 931 | 678 |
| 200% Modulus in PSI | | 1530 | | | 950 | 952 |
| 300% Modulus in PSI | | | | | 1471 | 1762 |
| Ultimate Tensile in PSI | 1562 | 1803 | 1705 | 1581 | 2518 | 2307 |
| Ultimate Elongation in % | 175 | 229 | 181 | 183 | 434 | 364 |
| Shore A Hardness ASTM D2240 | 77 | 83 | 83 | 82 | 73 | 69 |
| Specific Gravity ASTM D792 | 1.168 | 1.202 | 1.194 | 1.184 | 1.116 | 1.117 |
| Modulus/Tensile/Elongation ASTM D412 | | | | | | |
| Samples Cured 10'/340 F. Cured Samples Oven Aged 70 hours/257 F. | | | | | | |
| 100% Modulus in PSI | 759 | 790 | 1126 | 1120 | 1151 | 745 |
| 200% Modulus in PSI | | | | | 1180 | 1149 |
| 300% Modulus in PSI | | | | | | |
| Ultimate Tensile in PSI | 1694 | 1783 | 1539 | 1374 | 1257 | 1883 |

TABLE 2B-continued

| Test Results | | | | | | |
|---|---|---|---|---|---|---|
| Ultimate Elongation in % | 186 | 204 | 157 | 147 | 205 | 279 |
| Shore A Hardness ASTM D2240 | 78 | 87 | 85 | 82 | 72 | 71 |
| Measure of Load Carrying Capability | | | | | | |
| Load Deflection in-house variation on ASTM D575 Samples Cured 10'/340 F. lbf on 0.5" puck | | | | | | |
| lbf at 10% Deflection | 183 | 233 | 231 | 211 | 211 | 169 |
| lbf at 20% Deflection | 392 | 532 | 507 | 474 | 432 | 366 |
| lbf at 30% Deflection | 658 | 879 | 998 | 808 | 767 | 705 |
| lbf at 40% Deflection | 991 | 1328 | 1560 | 1287 | 1379 | 1270 |
| Measure of Heat Build-up/Generation and Fatigue Resistance due to Dynamic Cyclic Compression Blowout In-house variation on ASTM D623 | | | | | | |
| Samples Cured 35'/305 F. 1800 cycles/min 405 N Load | | | | | | |
| 6.35 mm stroke 93 C. preheat 0.7 in Dia | | rerun | | | | |
| Time to Blowout or 60 minutes | 60 min | 60 min | 60 min | 60 min | 30 min | 60 min |
| Temperature @ Blowout/End of Test | 128 C. | 138 C. | 134 C. | 132 C. | 160 C. | 144 C. @ EOT |
| Final Compression | 2.5 mm | 2.5 mm | 4 mm | 6 mm | 5 mm | 4 mm |
| First Inflection | 4 min @ 120 C. | 4 min @ 128 C. | 4 min @ 125 C. | 4 min @ 124 C. | 3 min @ 136 C. | 3 min @ 128 C. |
| Second Inflection | | | | | 7 min @ 152 C. | 8 min @ 138 C. |
| Appearance Inside Sample | nothing | nothing | nothing | nothing | sample fractured | nothing |
| Flex Fatigue In-house variation on ASTM D623 Samples Cured 10'/340 F. samples preconditioned to 122 F. 0.25" stroke/30 minutes | | | | | | |
| % Set | 3.6 | 3.1 | 2.0 | 1.4 | 8.9 | 6.0 |
| Temp Rise F. | 116 | 124 | 109 | 95 | 138 | 121 |
| Proprietary Fatigue Load Deflection Test Constant Load test developed in-house | | | | | | |
| Samples Cured 10'/340 F. | | | | | | |
| Tan Delta at 500 cycles | 0.089 | 0.138 | 0.105 | 0.092 | 0.137 | 0.115 |
| Tan Delta at 2000 cycles | 0.071 | 0.105 | 0.088 | 0.079 | 0.128 | 0.101 |
| Tan Delta at 6000 cycles | 0.063 | 0.091 | 0.079 | 0.071 | 0.161 | 0.096 |
| Tan Delta at 12000 cycles | 0.062 | 0.089 | 0.077 | 0.070 | — | 0.096 |
| Temp in C. at 500 cycles | 104.8 | 104.8 | 104.4 | 101.5 | 108.8 | 103.8 |
| Temp in C. at 2000 cycles | 113.2 | 116.8 | 114.2 | 111.3 | 126.3 | 119.8 |
| Temp in C. at 6000 cycles | 119.0 | 125.9 | 120.5 | 119.8 | 142.8 | 132.7 |
| Temp in C. at 12000 cycles | 120.1 | 127.2 | 121.3 | 120.9 | — | 134.7 |
| Sample Appearance | ok | ok | ok | ok | sample fractured | ok |
| Measure of Creep Compression Set In-house Variation on ASTM D395 constant deflection test | | | | | | |
| Samples Cured 10'/340 F. | | | | | | |
| % Set After 22 hours/212 F. | 10 | 14 | 10 | 11 | 24 | 19 |
| % Set After 22 hours/257 F. | 21 | 25 | 20 | 20 | 29 | 28 |
| Measure of Tear Resistance Related to Chip/Chunk field performance | | | | | | |

TABLE 2B-continued

Test Results

| | | | | | | |
|---|---|---|---|---|---|---|
| Die B Tear ASTM D624 | | | | | | |
| Samples Cure 10'/340 F. | | | | | | |
| Die B Tear @ 70 F. in lbf | 162 | 215 | 197 | 204 | 237 | 202 |
| Die B Tear @ 250 F. in lbf | 81 | 120 | 113 | 103 | 115 | 80 |
| Samples Oven Aged 70 hours/257 F. | | | | | | |
| Die B Tear @ 250 F. in lbf | 82 | 128 | 122 | 114 | 142 | 83 |
| Measure of Curing and Process Properties | | | | | | |
| Cure Rheometer ASTM D5289 | | | | | | |
| minutes at temp C. | 30'/170 C. | 30'/170 C. | 30'/170 C. | 30'/170 C. | 3 min @ 191 C. | 3 min @ 191 C. |
| minimum torque dN-m | 5.4 | 6.0 | 4.8 | 4.6 | 3.2 | 3.4 |
| maximum torque dN-m | 70.3 | 64.3 | 77.2 | 69.7 | 35.7 | 38.9 |
| net torque dN-m | | | | | | |
| T/rise in minutes | 0.3 | 0.3 | 0.3 | 0.3 | 0.2 | 0.2 |
| T25 in minutes | | | | | | |
| T50 in minutes | | | | | | |
| T90 in minutes | 7.7 | 5.1 | 7.5 | 7.6 | 1.4 | 1.5 |

| | Example 17 | Example 18 | Example 19 | Example 20 | SBR Control |
|---|---|---|---|---|---|
| Modulus - Measure of Stiffness in Tension | | | | | |
| Hardness - Measure of Stiffness in Compression | | | | | |
| Modulus/Tensile/Elongation ASTM D412 | | | | | | cure 25'/305 F. |
| Samples Cured 10'/340 F. | | | | | |
| 100% Modulus in PSI | 760 | 1024 | 670 | 775 | 772 |
| 200% Modulus in PSI | 972 | 1145 | 1071 | 1043 | 1765 |
| 300% Modulus in PSI | 1644 | 1988 | 1918 | 1757 | 2541 |
| Ultimate Tensile in PSI | 2252 | 2289 | 2215 | 2094 | 2788 |
| Ultimate Elongation in % | 379 | 334 | 326 | 339 | 342 |
| Shore A Hardness ASTM D2240 | 70 | 76 | 71 | 71 | 77 |
| Specific Gravity ASTM D792 | 1.115 | 1.123 | 1.117 | 1.125 | 1.201 |
| Modulus/Tensile/Elongation ASTM D412 | | | | | |
| Samples Cured 10'/340 F. | | | | | cure 25'/305 F. |
| Cured Samples Oven Aged 70 hours/257 F. | | | | | |
| 100% Modulus in PSI | 971 | 1245 | 762 | 974 | — |
| 200% Modulus in PSI | 1217 | 1422 | 1318 | 1263 | — |
| 300% Modulus in PSI | — | — | — | — | — |
| Ultimate Tensile in PSI | 1786 | 1414 | 1887 | 1839 | 1915 |
| Ultimate Elongation in % | 277 | 210 | 254 | 265 | 55 |
| Shore A Hardness ASTM D2240 | 72 | 77 | 73 | 73 | 90 |
| Measure of Load Carrying Capability | | | | | |
| Load Deflection in-house variation on ASTM D575 | | | | | |
| Samples Cured 10'/340 F. | | | | | |
| lbf on 0.5" puck | | | | | cure 25'/305 F. |
| lbf at 10% Deflection | 169 | 222 | 186 | 181 | 195 |
| lbf at 20% Deflection | 381 | 530 | 396 | 388 | 342 |

TABLE 2B-continued

| | Test Results | | | | |
|---|---|---|---|---|---|
| lbf at 30% Deflection | 724 | 1123 | 760 | 569 | 536 |
| lbf at 40% Deflection | 1322 | 1971 | 1327 | 1306 | 862 |
| Measure of Heat Build-up/ Generation and Fatigue Resistance due to Dynamic Cyclic Compression Blowout In-house variation on ASTM D623 | | | | | |
| Samples Cured 35'/305 F. | | | | | cure 25'/ 305 F. |
| 1800 cycles/min 405 N Load | | | | | |
| 6.35 mm stroke 93 C. preheat 0.7 in Dia | | | | | |
| Time to Blowout or 60 minutes | 60 min | 37 min | 60 min | 60 min | 60 min |
| Temperature @ Blowout/ End of Test | 152 C. | 151 C. | 148 C. | 144 C. | 176 C. |
| Final Compression | 4.5 mm | 4 mm | 3 mm | 3 mm | 9 mm |
| First Inflection | 3 min @ 130 C. | 3 min @ 132 C. | 3 min @ 128 C. | 3 min @ 128 C. | 3 min @ 128 C. |
| Second Inflection | 9 min @ 146 C. | 6 min @ 144 C. | 7 min @ 144 C. | 8 min @ 140 C. | 14 min @ 176 C. |
| Appearance Inside Sample | nothing | sample fractured | nothing | nothing | light porosity |
| Flex Fatigue In-house variation on ASTM D623 Samples Cured 10'/340 F. samples preconditioned to 122 F. 0.25" stroke/30 minutes | | | | | cure 25'/ 305 F. |
| % Set | 6.0 | 2.1 | 2.1 | n/a | 15.5 |
| Temp Rise F. | 124 | 104 | 105 | n/a | 161 |
| Proprietary Fatigue Load Deflection Test Constant Load test developed in-house | | | | | |
| Samples Cured 10'/340 F. | | | | | cure 25'/ 305 F. |
| Tan Delta at 500 cycles | 0.122 | 0.120 | 0.114 | 0.106 | 0.116 |
| Tan Delta at 2000 cycles | 0.107 | 0.112 | 0.101 | 0.096 | 0.099 |
| Tan Delta at 6000 cycles | 0.101 | 0.106 | 0.094 | 0.089 | 0.100 |
| Tan Delta at 12000 cycles | 0.101 | 0.107 | 0.095 | 0.087 | 0.109 |
| Temp in C. at 500 cycles | 106.2 | 105.3 | 105.3 | 105.3 | 105.1 |
| Temp in C. at 2000 cycles | 125.5 | 119.1 | 123.2 | 119.6 | 124.6 |
| Temp in C. at 6000 cycles | 141.5 | 131.4 | 134.7 | 130.1 | 137.6 |
| Temp in C. at 12000 cycles | 143.6 | 133.7 | 135.1 | 131.4 | 140.9 |
| Sample Appearance | ok | ok | ok | ok | ok |
| Measure of Creep Compression Set In-house Variation on ASTM D395 constant deflection test | | | | | |
| Samples Cured 10'/340 F. | | | | | cure 25'/ 305 F. |
| % Set After 22 hours/ 212 F. | 20 | 16 | 16 | 15 | 54 |
| % Set After 22 hours/257 F. | 33 | 26 | 24 | 23 | 68 |
| Measure of Tear Resistance Related to Chip/Chunk field performance Die B Tear ASTM D624 | | | | | |
| Samples Cure 10'/340 F. | | | | | cure 25'/ 305 F. |

TABLE 2B-continued

| Test Results | | | | | |
|---|---|---|---|---|---|
| Die B Tear @ 70 F. in lbf | 201 | 248 | 171 | 189 | 268 |
| Die B Tear @ 250 F. in lbf | 87 | 131 | 95 | 93 | 156 |
| Samples Oven Aged 70 hours/257 F. | | | | | |
| Die B Tear @ 250 F. in lbf | 101 | 137 | 91 | 109 | 83 |
| Measure of Curing and Process Properties Cure Rheometer ASTM D5289 | | | | | |
| minutes at temp C. | 3 min @ 191 C. | 3 min @ 191 C. | 3 min @ 191 C. | 3 min @ 191 C. | 30 @ 152 C. |
| minimum torque dN-m | 3.2 | 3.8 | 3.4 | 3.3 | 9.8 |
| maximum torque dN-m | 35.6 | 45.7 | 42.6 | 41.7 | 50.6 |
| net torque dN-m | | | | | 40.8 |
| T/rise in minutes | 0.2 | 0.2 | 0.2 | 0.2 | 5.9 |
| T25 in minutes | | | | | 9.5 |
| T50 in minutes | | | | | 12.0 |
| T90 in minutes | 1.5 | 1.6 | 1.6 | 1.6 | 24.0 |

Concerning the modulus/tensile/elongation testing, generally, larger modulus, tensile, and elongation values tends to be indicative of a desirable stiffness in tension and compression for the rubber compound. Those properties, when considered with respect to the SBR control sample, however, need to be balanced with the other properties. With the aged modulus/tensile/elongation testing, in general, the least amount of change from the original is best. All of the EPDM samples indicate less change on heat aging as compared to the SBR control sample.

Concerning the load deflection testing, higher lbf per percent deflection tends to be indicative of a desirable load carrying capability of the rubber compound. Again, those properties, when considered with respect to the SBR control sample, also need to be balanced with the other properties. Based upon the test results, the EPDM samples appeared to perform generally at least as good or better than the SBR control sample.

With respect to determining heat buildup characteristics, minimization of temperature increase of the sample was desirable as this would translate to lower temperatures for the bushing rubber. A sample with a low tan delta is also desirable. And, low % set or final compression values tend to be indicative of desirable resistance to creep. In addition, the sample needs to survive cyclic dynamic compressions without fail. As such, a sample that fractures during testing or one that forms porosity and/or internal cavities due to high temperature increases is not desirable. Concerning creep testing, this is another measure of the resistance of the sample to changes due to heat. Based on the test results, all EPDM test samples showed significant improvement as compared to the SBR control sample.

Concerning tear resistance and aged tear testing, higher numbers tend to be indicative of desirable tear properties. Based upon the test results for the aged tear testing, all of the EPDM samples showed less change as compared to the SBR control. With respect to the cure testing, for processing, a low torque with a safe cure time is desirable. However, this property is mainly for plant processing as compared to field performance.

Overall, EPDM test sample 7 appeared to provide the most desirable characteristics when compared to the SBR control sample. However, other suitable EPDM (as well as EPM) rubber based compounds are provided for use as backers in track segments for track vehicles subjected to hot climates.

Such EP(D)M rubber based backers can provide a desirable balance of low heat build-up under heavy dynamic cyclic compression conditions, and also have a desirable load carrying capability, high heat resistance, and good cut/tear strength in hot climates.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A track segment comprising:
   (1) a backer which is comprised of an EP(D)M rubber which is cured with a peroxide curing agent, carbon black, a hydrated amorphous silica, a vinyl silane coupling agent, and one or more acrylic and/or methacrylic coagents;
   (2) a track pad; and
   (3) a metallic track body, the track pad and backer cooperating with the track body to define the track segment;
   wherein the backer exhibits reduced heat build-up under heavy dynamic cycle compression conditions as compared to conventional backers which are comprised of styrene-butadiene rubber.

2. The track segment of claim 1 wherein the one of more acrylic and/or methacrylic coagents include a metal salt or ester or acrylic or methacrylic acid.

3. The track segment of claim 1 wherein the one of more acrylic and/or methacrylic coagents includes zinc diacrylate, zinc dimethacrylate, or acrylic esters.

4. The track segment of claim 1 wherein the EP(D)M rubber has ethylene in a range of about 50% to about 70% by weight.

5. The track segment of claim 1 wherein the peroxide curing agent is present in amount of about 0.5 phr to about 9 phr.

6. The track segment of claim 1 wherein the EP(D)M rubber is an EPDM rubber and wherein the EPDM rubber is present at a level of 100 phr.

7. The track segment of claim 1 wherein the one or more acrylic and/or methacrylic coagents is present in an amount of about 5 phr to about 30 phr.

8. The track segment of claim 7 wherein the metal salt or ester or acrylic or methacrylic acid includes zinc diacrylate, zinc dimethacrylate, or acrylic esters.

9. The track segment of claim 8 wherein the EP(D)M rubber has ethylene in a range of about 50% to about 70% by weight.

10. A track for use with a track vehicle which is comprised of a plurality of the track segments of claim 1.

11. The track segment of claim 1 wherein the EP(D)M rubber is an EPM rubber.

12. A method of making an EP(D)M rubber based backer for a track segment which includes (1) the backer, (2) a track pad, and (3) a metallic track body, wherein the track pad and backer cooperating with the track body to define the track segment, said method comprising:
   (1) mixing an EP(D)M rubber with a peroxide curing agent, carbon black, a hydrated amorphous silica, a vinyl silane coupling agent, and one or more acrylic and/or methacrylic coagents in a productive mixing stage to produce an uncured EP(D)M rubber composition;
   (2) shaping the uncured EP(D)M rubber into the form of the backer, wherein the backer includes a metallic track body; and
   (3) curing the uncured EP(D)M rubber to produce the EP(D)M rubber based backer;
wherein the backer exhibits reduced heat build-up under heavy dynamic cycle compression conditions as compared to conventional backers which are comprised of styrene-butadiene rubber.

13. The method of claim 12 wherein the one or more acrylic and/or methacrylic coagents include a metal salt or ester of acrylic or methacrylic acid.

14. The method of claim 12 wherein the one or more acrylic and/or methacrylic coagents includes zinc diacrylate, zinc dimethacrylate, or acrylic esters.

15. The method of claim 12 wherein the EP(D)M rubber has ethylene in a range of about 50% to about 70% by weight.

16. The method of claim 12 wherein the peroxide curing agent is present in an amount of about 0.5 to about 9 phr.

17. The method of claim 16 wherein the EP(D)M rubber is an EPDM rubber and wherein the EPDM rubber is present at a level of 100 phr.

18. The method of claim 12 wherein one or more acrylic and/or methacrylic coagents is present in an amount of about 5 phr to about 30 phr.

19. The method of claim 14 wherein the EP(D)M rubber is an EPM rubber.

* * * * *